United States Patent [19]

Yamada et al.

[11] Patent Number: 4,558,238

[45] Date of Patent: Dec. 10, 1985

[54] PRESSURE TRANSDUCER USING INTEGRATED CIRCUIT ELEMENTS

[75] Inventors: Kazuji Yamada; Hideo Sato, both of Hitachi; Yukitaka Kitadate, Iwaki; Kanji Kawakami, Mito; Kazuo Kato, Ibaraki; Takao Sasayama, Hitachi, all of Japan

[73] Assignee: Hitachi, Ltd., Tokyo, Japan

[21] Appl. No.: 536,870

[22] Filed: Sep. 29, 1983

[30] Foreign Application Priority Data

Oct. 1, 1982 [JP] Japan .................................. 170832

[51] Int. Cl.[4] .............................................. G01L 9/06
[52] U.S. Cl. .................................... 307/491; 307/297; 307/310; 73/708; 338/3; 323/907
[58] Field of Search ................. 73/708, 720, 721, 726, 73/727; 307/491–493, 297, 308, 310; 323/312–314, 907; 338/3, 4

[56] References Cited

U.S. PATENT DOCUMENTS

| 3,886,799 | 6/1975 | Billette et al. ................. 338/3 X |
| 4,233,848 | 11/1980 | Sato et al. ..................... 73/708 X |
| 4,300,395 | 11/1981 | Shirouzu et al. ................ 73/708 |
| 4,313,082 | 1/1982 | Neidorff ......................... 323/312 |
| 4,362,060 | 12/1982 | Okayama et al. ................. 73/708 |
| 4,422,033 | 12/1983 | Minner et al. ................... 323/314 |
| 4,476,726 | 10/1984 | Kurtz et al. ..................... 73/708 |
| 4,479,708 | 10/1984 | Tokuda ........................ 307/297 X |

FOREIGN PATENT DOCUMENTS 0037906 3/1980 Japan ................................. 73/708

Primary Examiner—Stanley D. Miller
Assistant Examiner—D. R. Hudspeth
Attorney, Agent, or Firm—Antonelli, Terry & Wands

[57] ABSTRACT

A pressure transducer comprises a pressure sensor including a bridge connection of gauging resistors formed on a semiconductor substrate, and a power supply connected to the pressure sensor for driving it and basically acting as a constant current source. The power supply includes at least two transistors formed on the semiconductor substrate. One of the transistors provides a collector current which is less in temperature-dependency relative to that of the other transistor, and the other transistor has a collector circuit connected to the pressure sensor and provides a collector current corresponding to a sum of a substantially temperature-dependent current and a substantially temperature-independent current. A ratio of the temperature-dependent current to the temperature-independent current is adjusted by selecting operation characteristics of the two transistors such that a temperature characteristic of the collector current of the other transistor is substantially inversely proportional to a temperature characteristic of the output of the pressure sensor when it is driven with a constant voltage.

6 Claims, 11 Drawing Figures

PRESSURE TRANSDUCER USING INTEGRATED CIRCUIT ELEMENTS

BACKGROUND OF THE INVENTION

1. FIELD OF THE INVENTION

The present invention relates to a pressure transducer, and more particularly to a pressure transducer having an integrated pressure sensor formed in a bridge circuit, and a temperature compensation circuit.

2. DESCRIPTION OF THE PRIOR ART

A semiconductor pressure transducer is known, in which a thin diaphragm is formed at a center of a silicon single crystal plate and gauging resistors are formed on the surface of the diaphragm by impurity diffusion layers, and the gauging resistors are connected to form a sensor of bridge circuit. Recently, a semiconductor pressure transducer has been proposed in which a temperature compensation circuit for a sensitivity of the sensor or an amplifier is integrated on the diaphragm surface or a peripheral thick area of the diaphragm. The sensitivity of the semiconductor pressure sensor is lowered as a temperature rises. Therefore, the temperature compensation is essential. The temperature compensation circuit may utilize a circuit called an $nV_{BE}$ network disclosed, for example, in U.S. Pat. No. 3,836,796 issued Sept. 17, 1974 to I. E. Solomon et al. and entitled "Semiconductor Pressure Transducer Employing Novel Temperature Compensation Means". The $nV_{BE}$ network utilizes a property that a base-emitter voltage $V_{BE}$ of a transistor decreases as a temperature rises. The $nV_{BE}$ circuit is connected in series with the bridge circuit of the pressure sensor and the series circuit is energized by a regulated power supply so that a voltage applied to the bridge circuit is raised by the amount corresponding to the reduction of $V_{BE}$ of the $nV_{BE}$ network due to the temperature rise in order to compensate for the reduction of the sensitivity. However, in the temperature compensation circuit which employs the $nV_{BE}$ network, the $V_{BE}$ voltage of the transistor is determined by a collector current and not influenced by the change of the power supply voltage. As a result, even if the power supply voltage varies, the amount of temperature compensation is substantially constant. On the other hand, the sensitivity of the bridge circuit changes in proportion to the power supply voltage. Accordingly, when the power supply voltage rises, the circuit is under-compensated and when the power supply voltage drops, the circuit is overcompensated. In the above U.S. Patent, a voltage regulator having a temperature compensation circuit by another $nV_{BE}$ network is used to overcome the above problem.

A temperature compensation circuit used to drive the bridge circuit of the pressure sensor with a constant current is disclosed in copending U.S. patent application Ser. No. 522,227 filed on Aug. 11, 1983 by K. Yamada et al. and entitled "Pressure Transducer with Temperature Compensation Circuit". The disclosed temperature compensation circuit basically resolves the above problem for the constant-current driven bridge circuit of the pressure sensor. A power amplifier of the bridge circuit may use the disclosed temperature compensation circuit to drive the bridge circuit with a constant voltage but it is basically not suitable to the constant-voltage driven bridge circuit.

SUMMARY OF THE INVENTION

It is an object of the present invention to provide a pressure transducer with a temperature compensation circuit which overcomes a problem of undercompensation due to a variation of a power supply voltage in a prior art temperature compensation circuit and attains correct temperature compensation irrespective of the variation of the power supply voltage.

In order to achieve the above object, in accordance with the present invention, there is provided a pressure transducer which comprises a semiconductor substrate, a pressure sensor including a bridge connection of gauging resistors formed on the semiconductor substrate, and at least two transistors formed on the semiconductor substrate and connected to the pressure sensor to basically serve as a constant current source to drive the pressure sensor, wherein one of the transistors provides a collector current which is less in temperature dependency relative to that of the other transistor and the other transistor includes a collector circuit connected to the pressure sensor to provide a collector current corresponding to a sum of a temperature-dependent current and a temperature independent current, and a ratio of the temperature-dependent current to the temperature-independent current is adjusted by selecting operation characteristics of the two transistors such that a temperature characteristic of the collector current of the other transistor is essentially inversely proportional to a temperature characteristic of an output of the pressure sensor when it is driven with a constant voltage.

DESCRIPTION OF THE PREFERRED EMBODIMENTS

Figure 1A:
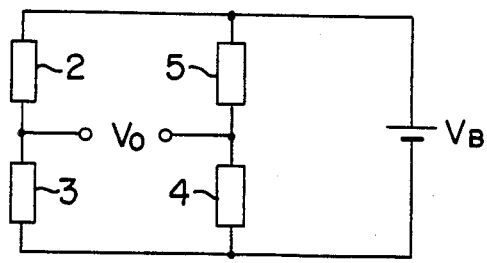
FIGS. 1A and 1B show a basic circuit of a constant-voltage driven pressure sensor and a temperature characteristic of a sensitivity thereof.
Figure 1B:
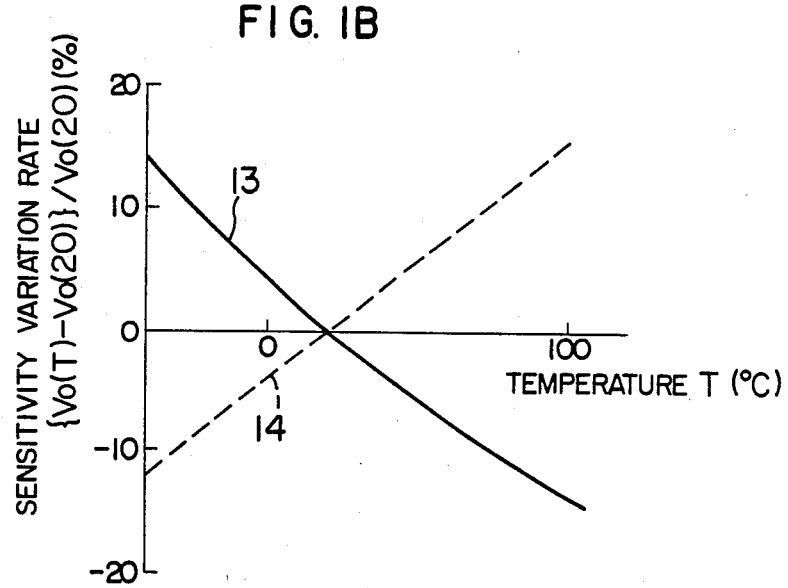

Before explaining the preferred embodiments of the present invention, a temperature characteristic of a constant-voltage driven pressure sensor including a bridge circuit of diffusion gauging resistors formed on a silicon diaphragm is first explained. In FIG. 1A, the diffusion gauging resistors 2-5 formed on the silicon diaphragm surface are connected to form the bridge circuit, which is driven with a constant voltage $V_B$. A bridge output $V_0$ for a given pressure usually depends on a temperature. FIG. 1B shows an example of the temperature characteristic. An ordinate represents a sensitivity variation rate given by the following formula:

$$\frac{V_0(T) - V_0(20)}{V_0(20)} \times 100 \, (\%) \tag{1}$$

where $V_0(T)$ is a bridge output at a temperature of T and $V_0(20)$ is a bridge output at a reference temperature of 20° C. A curve 13 shows a measured result. The characteristic may slightly change depending on an impurity concentration of the gauging resistor and a thermal stress developed in the silicon diaphragm. In any case, at the commonly used impurity concentration, there is a tendency that the sensitivity is high at a low temperature and low at a high temperature. In order to compensate for the temperature characteristic, it is necessary to have a temperature characteristic of a drive voltage $V_B$ as shown by a curve 14. By having the characteristic of the curve 14, the variation of the output voltage by the temperature can be suppressed.

Figure 2A:
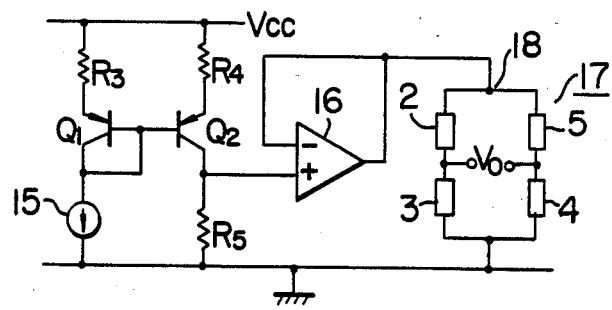
FIGS. 2A and 2B show basic units of a temperature compensation circuit of the present invention.

FIG. 2A shows a circuit which produces a drive voltage having a temperature characteristic like the curve 14 of FIG. 1B. A circuit comprising transistors $Q_1$ and $Q_2$, resistors $R_3$ and $R_4$ and a constant current source 15 forms a constant current source which has the temperature characteristic of the curve 14 of FIG. 1B. The current is converted to a voltage by the resistor $R_5$ and an amplifier 16 and the resulting voltage is applied to a voltage supply terminal 18 of a pressure sensor bridge 17.

The reason why the circuit of the present invention exhibits the temperature characteristic of the curve 14 of FIG. 1B is now explained. In FIG. 2A, it is effective that an emitter area of $Q_2$ is larger than that of $Q_1$. A ratio of the emitter area of $Q_2$ to that of $Q_1$ is represented by $\gamma$. By using well-known Ebers-Moll model for representing the characteristics of the transistors, collector currents $I_{C1}$ and $I_{C2}$ of $Q_1$ and $Q_2$ are represented by $$I_{C1} \approx I_{S1} \exp(qv_{BE1}/kT) \tag{3}$$

$$I_{C2} \approx \gamma I_{S1} \exp(qv_{BE2}/kT) \tag{4}$$

where $I_{S1}$ is a saturation current of the transistor $Q_1$, q is a charge, $V_{BE1}$ and $V_{BE2}$ are base-emitter voltages of the transistors $Q_1$ and $Q_2$, respectively, k is a Boltzman's constant, and T is an absolute temperature.

Since the voltages between $V_{cc}$ and the bases of $Q_1$ and $Q_2$ are equal, the following relation is met.

$$V_{BE1} + R_3 I_{ref} = V_{BE2} + R_4 I_{C2} \tag{5}$$

where $I_{ref}$ is a current of the constant current source 15 and a current amplification factor $h_{FE}$ of each transistor is assumed to be infinite. This assumption is sufficient for a semi-quantitative explanation. By putting the formulas (3) and (4) in the formula (5), we get $$\frac{1}{R_4} \cdot \frac{kT}{q} \cdot \ln \frac{I_{ref}}{I_{C2}} \cdot \gamma + \frac{R_3}{R_4} \cdot I_{ref} = I_{C2} \tag{6}$$

The first term in the left side of the formula (6) is a current term which is proportional to the absolute temperature T, and the second term is a constant term. By increasing the first term component, the temperature dependency is increased, and by increasing the second term component, the temperature dependency is decreased. In order to attain a positive temperature coefficient of the temperature characteristic of $I_{C2}$ as shown by the curve 14 of FIG. 1B, the following requirements must be met.

(1) $I_{ref} > I_{C2}$
(2) $\gamma > 1$

Assuming that $I_{ref}$ is constant, the second term of the formula (6) increases as the resistor $R_3$ increases, and the positive temperature characteristic is reduced. If the resistor $R_4$ is increased, the left side decreases although the first term of the left side includes $I_{C2}$ in the logarithmic function, and the $I_{C2}$ also decreases. Since the first term of the left side includes $I_{C2}$ in the denominator of the logarithmic function, the decrease rate of the first term of the left side to the increase of $R_4$ is smaller than that of the second term. Accordingly, a large positive temperature characteristic is attained. In this manner, an optimum compensation characteristic is attained by proper selection of $R_3$ or $R_4$.

However, a constant voltage must be supplied to a silicon strain gauge. Thus, the collector current $I_{C2}$ of the transistor $Q_2$ is converted to a voltage determined by $I_{C2} \cdot R_5$ by the temperature-independent resistor $R_5$ and the operational amplifier 16 and this voltage is applied to the terminal 18 of the bridge circuit 17.

Figure 2B:
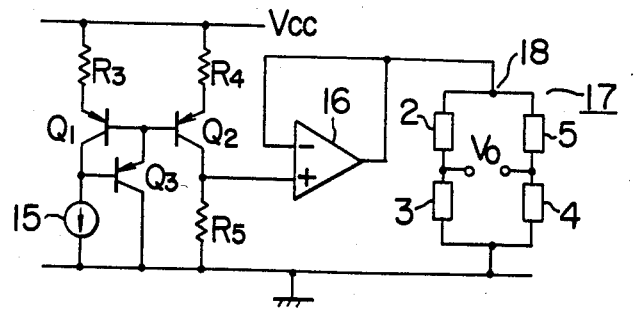

The basic circuit of FIG. 2A is subject to the influence of the current amplification factor $h_{FE}$ of the transistor. FIG. 2B shows a practical circuit which includes an additional transistor $Q_3$ for bypassing the base currents of the transistors $Q_1$ and $Q_2$. The principle of operation is similar and hence it is not explained here.

Figure 3:
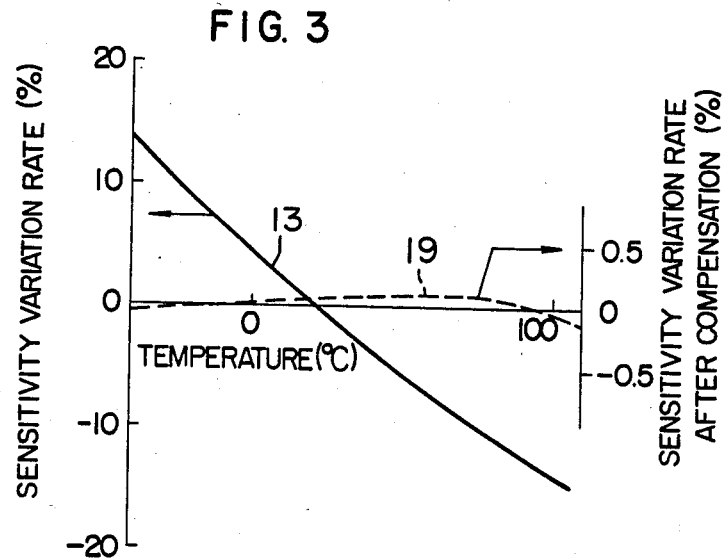
FIG. 3 shows a temperature characteristic of a sensitivity of a pressure transducer constructed by the circuit of FIG. 2B.

An optimum compensation effect attainable by the circuit of FIG. 2B when the circuit elements have characteristics as designed is shown in FIG. 3. A curve 13 corresponds to the curve 13 in FIG. 1B and a curve 19 shows the compensation characteristic by the circuit of FIG. 2B. It shows a deviation of the temperature characteristic of the voltage at the terminal 18 of the bridge circuit of FIG. 2B from the curve 14 of FIG. 1B. It shows that a good compensation is attained.

Figure 4A:
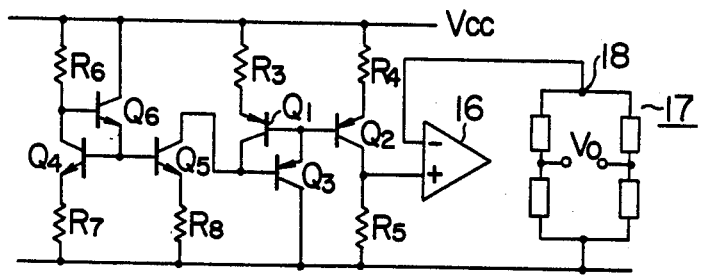
FIGS. 4A and 4B show a circuit diagram of another embodiment of the present invention and a temperature characteristic of a sensitivity thereof.

The example of FIG. 3 shows an ideal case where the output of the constant current source is constant independently from the temperature. When the gauging resistors and the peripheral circuit are integrated, it is difficult to attain a constant current source which is not affected by the temperature. FIG. 4A shows a circuit which uses a constant current circuit frequently used for the integrated circuit. A circuit comprising transistors $Q_4$, $Q_5$ and $Q_6$ corresponds to the constant current circuit 15 of FIG. 2B and a collector current $I_{C5}$ of the transistor $Q_5$ corresponds to the constant current of the circuit 15 of FIG. 2B. In FIG. 4A, the base-emitter voltage of the transistor decreases as the temperature rises, and the collector current $I_{C5}$ of the transistor $Q_5$ increases. Thus, the optimum values of the resistors $R_3$ and $R_4$ are different from those of FIG. 2B.

Figure 5:
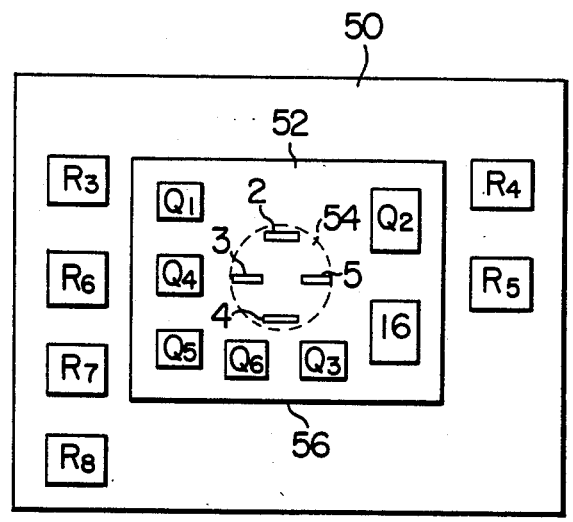
FIG. 5 shows arrangement of circuit elements of the circuit of FIG. 4.

FIG. 5 shows an arrangement of integration of the elements of the pressure transducer of FIG. 4A. Numeral 52 denotes a rectangular Si single crystal semiconductor substrate. A thin diaphragm 54, preferably of a circular or polygonal form, is formed at a center of the rear side of the substrate and a periphery 56 of the substrate forms a thick support area. The substrate 52 is fitted in and fixed to an opening formed at a generally center of a ceramic plate 50, and a pressure to be measured is applied to the diaphragm 54 by an appropriate pressure applying device (not shown). Of the elements of the circuit of FIG. 4A, the gauging resistors 2, 3, 4 and 5 are formed in the diaphragm 54 by diffusion and the transistors $Q_2$, $Q_3$, $Q_4$, $Q_5$ and $Q_6$ and the amplifier 16 are formed in the peripheral area 56 by diffusion. On the other hand, the fixed resistors $R_3$, $R_4$, $R_5$, $R_6$, $R_7$ and $R_8$ are formed by thick film resistors and they are trimmed to exhibit required resistances and externally mounted on the substrate. Those elements are interconnected through appropriate wirings (not shown) to construct the circuit of FIG. 4A.

Figure 4B:
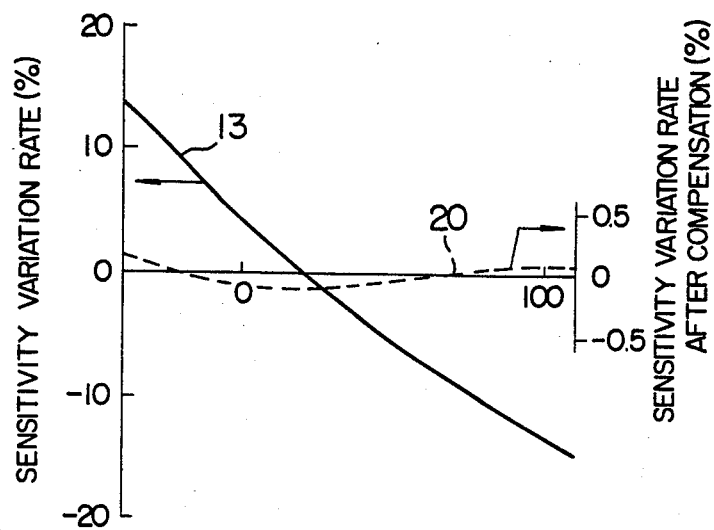

The temperature compensation characteristic of the sensitivity in the embodiment of FIG. 4A is shown in FIG. 4B. A curve 13 represents a sensitivity-temperature characteristic of the pressure transducer, corresponding to the curve 13 of FIG. 1B and the curve 13 of FIG. 3. A curve 20 shows a deviation of the characteristic from an ideal compensation characteristic, that is, a characteristic which assures a constant bridge output voltage $V_0$ independently of the temperature. It is seen that an excellent compensation of within ±0.1% is attained, as is done in FIG. 3. The curve of FIG. 4B was attained when the resistor $R_6$ is fixed and the temperature coefficient is zero.

When the constant current source constructed by the transistors $Q_4$, $Q_5$ and $Q_6$ of FIG. 4A is omitted and a resistor is connected between the collector and the base of the transistor $Q_3$, a similar characteristic is attained. A substantially equal compensation to that of FIG. 4A is attained with a smaller number of circuit elements than that of FIG. 4A although calculation for determining the compensation constants is complex.

Figure 6:
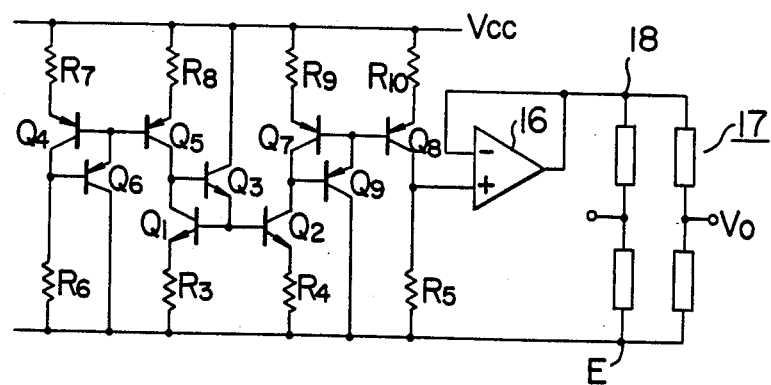
FIG. 6 shows a circuit diagram of a further embodiment of the present invention.

FIG. 6 shows other embodiment. In the circuit of FIG. 4A, the transistors $Q_1$, $Q_2$ and $Q_3$ are pnp transistors. In the present embodiment, they are replaced by npn transistors. The elements having the like functions are designated by the like numerals and symbols. By using the npn transistors, the characteristic is improved and the space required is reduced, but since the collectors cannot be grounded, the output current of the circuit of the transistors $Q_1$, $Q_2$ and $Q_3$ (collector current of $Q_2$) is transferred to a collector current of a transistor $Q_8$ by a current miller circuit comprising transistors $Q_7$, $Q_8$ and $Q_9$ and it is detected through a resistor $R_5$ using a ground potential E as a reference. A constant current source comprises transistors $Q_4$, $Q_5$ and $Q_6$ and resistors $R_6$, $R_7$ and $R_8$. In an integrated circuit, the pnp transistor requires a larger space than the npn transistor. Thus, in the circuit of FIG. 6, when the emitter area of $Q_2$ is designed to be larger than that of $Q_1$, a chip area can be reduced because $Q_1$ and $Q_2$ are npn transistors.

When a resistor is inserted between the base and the collector of the transistor $Q_3$ in place of the constant current circuit, a similar function is attained.

Figure 7A:
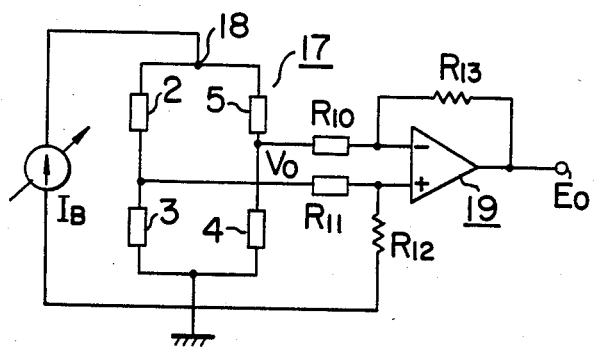
FIGS. 7A and 7B show modification of the temperature compensation circuit of the present invention when an output of a bridge circuit is supplied to an amplifier of a specific configuration.
Figure 7B:
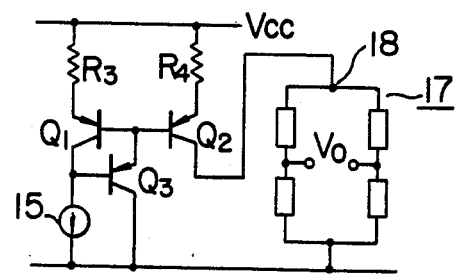

The output of the bridge circuit is usually supplied to an external circuit (not shown) through an amplifier. Depending on a configuration of the amplifier, it may be necessary to modify the bridge circuit. For example, as shown in FIG. 7A, let us assume that resistors $R_{10}$ and $R_{11}$ of the amplifier 19 are formed on the semiconductor substrate by diffusion and they are subject to the influence of temperature to the same extent as the gauging resistors 2-5 are, and resistors $R_{12}$ and $R_{13}$ are formed by fixed resistors such as thick film resistors and little influenced by the temperature. Thus, a gain of the amplifier which is determined by $R_{13}/R_{13}$ is subject to the influence of the temperature. In order to compensate for this influence, it has been found that the temperature characteristic of the current supplied to the bridge 17 must follow the curve 14 of FIG. 1B. Since it is not necessary to convert the current to the voltage by the amplifier 16 as opposed to the previous embodiments, a basic circuit shown in FIG. 7B may be used. The operation of this basic circuit is similar to that described above. The present embodiment can simplify the temperature compensation circuit.

While the preferred embodiments of the present invention have been described, the present invention is not limited to those embodiments but various modifications thereof are also within the scope of the present invention as will be readily understood by those skilled in the art.

We claim:

1. A pressure transducer comprising:
   a semiconductor substrate;
   a pressure sensor including a bridge connection of gauging resistors formed on said semiconductor substrate; and
   a power supply connected to said pressure sensor for driving said pressure sensor, said power supply basically acting as a condtant current source and including at least two transistors formed on said semiconductor substrate, wherein
   one of said transistors provides a collector current which is less in temperature dependency relative to that of the other transistor and, the other transistor has a collector circuit connected to said pressure sensor and providing a collector current corresponding to a sum of a substantially temperature-dependent current and a substantially temperature-independent current, and
   a ratio of said temperature-dependent current to said temperature-independent current is adjusted by selecting operation characteristics of said two transistors such that a temperature characteristic of the collector current of said other transistor is substantially inversely proportional to a temperature characteristic of said pressure sensor when said pressure sensor is driven with a constant voltage.

2. A pressure transducer according to claim 1 wherein the operation characteristics of said two transistors are adjusted by varying a ratio of emitter areas of said two transistors.

3. A pressure transducer according to claim 2 further including a third transistor for compensating current amplification factors of said two transistors.

4. A pressure transducer according to claim 2 wherein said two transistors are pnp transistors, an essentially temperature-independent resistor is connected to the collector circuit of said other transistor, and a voltage across said resistor is applied to said pressure sensor.

5. A pressure transducer according to claim 2 wherein said two transistors are npn transistors, and the collector circuit of said other transistor is applied through a current miller circuit to a substantially temperature-independent resistor and a voltage across said resistor is applied to said pressure sensor.

6. A pressure transducer according to claim 1 wherein an output of said pressure sensor is supplied to an amplifier having a temperature-dependent gain and said pressure sensor is driven by the collector current of said other transistor.

* * * * *